United States Patent
Suzuki et al.

(10) Patent No.: US 10,597,044 B2
(45) Date of Patent: Mar. 24, 2020

(54) IN-VEHICLE SYSTEM

(71) Applicant: YAZAKI CORPORATION, Tokyo (JP)

(72) Inventors: Yukio Suzuki, Shizuoka (JP); Kenichi Nagahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/297,827

(22) Filed: Mar. 11, 2019

(65) Prior Publication Data

US 2019/0276048 A1    Sep. 12, 2019

(30) Foreign Application Priority Data

Mar. 12, 2018 (JP) ................................ 2018-044602

(51) Int. Cl.
| | | |
|---|---|---|
| B60W 50/14 | (2020.01) | |
| H04M 1/725 | (2006.01) | |
| H04W 4/40 | (2018.01) | |
| G05D 1/00 | (2006.01) | |

(52) U.S. Cl.
CPC .......... B60W 50/14 (2013.01); G05D 1/0088 (2013.01); H04M 1/72577 (2013.01); H04W 4/40 (2018.02); B60K 2370/195 (2019.05); B60W 2050/146 (2013.01)

(58) Field of Classification Search
CPC ........................ B60W 50/14; B60W 2050/146
USPC ........................................................ 340/438
See application file for complete search history.

(56) References Cited

U.S. PATENT DOCUMENTS

| 2004/0214615 | A1 | 10/2004 | Entenmann et al. |
| 2012/0277947 | A1 | 11/2012 | Boehringer et al. |
| 2013/0295908 | A1* | 11/2013 | Zeinstra ............ H04M 1/72577 455/418 |
| 2016/0121907 | A1* | 5/2016 | Otake .................... B60W 50/14 701/23 |
| 2017/0106839 | A1* | 4/2017 | Uechi ........................ B60T 7/22 |
| 2018/0297612 | A1* | 10/2018 | Fukamachi ............ B60W 50/14 |
| 2019/0070963 | A1* | 3/2019 | Jang ........................ B60K 37/06 |

FOREIGN PATENT DOCUMENTS

| DE | 10 2004 037 231 A1 | 2/2006 |
| DE | 10 2009 054 100 A1 | 6/2010 |
| DE | 10 2009 048 954 A1 | 4/2011 |
| DE | 10 2012 112 296 A1 | 6/2014 |
| EP | 1 467 543 A2 | 10/2004 |
| JP | 2000-349895 A | 12/2000 |
| JP | 2014-506081 A | 3/2014 |
| JP | 2017-74909 A | 4/2017 |

* cited by examiner

*Primary Examiner* — Qutbuddin Ghulamali
(74) *Attorney, Agent, or Firm* — Kenealy Vaidya LLP

(57) ABSTRACT

An in-vehicle system is mountable on a vehicle having an automated driving function for automatically controlling at least one of steering and a vehicle speed of the vehicle. The in-vehicle system includes: an information presentation unit configured to present information related to automated driving to a driver of the vehicle; and a call management unit connectable to a mobile terminal capable of wireless communication. When a situation in which the information presentation unit presents information related to automated driving is detected, the call management unit automatically restricts an operation of the mobile terminal.

5 Claims, 8 Drawing Sheets

IN-VEHICLE SYSTEM

CROSS-REFERENCES TO RELATED APPLICATIONS

This application is based on and claims priority from Japanese Patent Application No. 2018-044602 filed on Mar. 12, 2018, the entire contents of which are incorporated herein by reference.

FIELD

One or more aspects of the present invention relate to an in-vehicle system for presenting information related to automated driving to a driver of a vehicle on the vehicle equipped with an automated driving function, and more particularly to a technique for using a terminal such as a mobile phone on a vehicle.

BACKGROUND

A radio wave blocking device of an automobile disclosed in, for example, JP-A-2000-349895 proposes a technique for making it impossible for a driver to perform transmission and reception through a mobile phone while the automobile is driven and eliminating a car accident caused by a mobile phone call. Specifically, it is determined that driving is possible when an engine key is turned and a starter motor of an engine is started and, in this case, a blocking wave for blocking the reception and transmission of radio waves of the same predetermined frequency as that of a mobile phone owned by a driver is emitted around a driver's seat through an antenna of blocking wave emission means.

In addition, an in-vehicle electronic device blocker disclosed in JP-A-2014-506081 proposes a method for controlling the operability and functionality of an electronic device in a vehicle. Specifically, when any one of usage prohibition conditions is satisfied in a state in which an electronic device located in a vehicle is close to a driver of the vehicle, the function of the electronic device in use is restricted. Also, deployment of an airbag is exemplified as an example of the usage prohibition condition.

Further, JP-A-2017-74909 discloses a technology of a pre-crash safety system (PCS) mounted on a vehicle. That is, a brake control device determines the possibility of the vehicle colliding with an object based on object information (distance, direction, relative speed, and the like) obtained from a millimeter wave radar device and a camera device and PCS automatic braking for automatically applying a braking force to the vehicle is executed when it is determined that the possibility of the vehicle colliding with the object is high.

SUMMARY

In the automobile manufacturing industry, development of a technology for automating a part of driving operations and a technology for automated driving in which almost all driving operations are automatically carried out by a system including a computer instead of an occupant are promoted in addition to the automatic braking device as disclosed in JP-A-2017-74909.

When a vehicle equipped with an automated driving system travels in automated driving, there are cases where a situation where the system cannot sufficiently deal with the situation is encountered. Therefore, under such a situation, it is considered whether driving of the vehicle is continued by driver's determination and driving operation by performing handover (H/O) from an automated driving mode to a manual driving mode or, if it is not possible, the vehicle is automatically stopped. Further, handover from an automated driving mode which does not require any assistance from a driver to an automated driving mode requiring assistance by a driver may be performed in some cases.

When the handover as described above is executed, a system presents an important message such as "Please switch to manual driving" by display, voice, or the like and informs a driver that the handover is necessary. Then, when a driver starts manual driving operations, the handover is actually executed and the mode transits to the manual driving mode or the like.

In this case, in order to smoothly perform the handover from the automated driving mode to the manual driving mode, it is necessary for a system to give some attention attraction to a driver and urge the driver to prepare for the handover before actual handover occurs. That is, it is also necessary to notify a driver in advance of the possibility of handover so that the handover request does not suddenly occur. Here, it is assumed that, based on the prediction of the road conditions or the like, the system gives attention attraction such as "one minute left until automated driving ends" to a driver and urges the driver to prepare for the handover before a handover request actually occurs.

Also, it is not limited to the case of handover as described above, where it is necessary to communicate information from a system on the vehicle side to a driver. When, for example, the automatic braking device as disclosed in JP-A-2017-74909 is activated while the vehicle is driven, it is preferable to transmit, for example, a message indicating that the automatic braking device has been activated from the system to a driver, so that the driver can quickly grasp the current situation of a host vehicle. Therefore, the driver does not panic at sudden deceleration, and thus safety of driving can be ensured.

Meanwhile, there is a possibility that information transmission from a system on the vehicle side to a driver may fail. Such a failure hinders the smooth handover as described above or leads to the occurrence of a situation where it is not possible to perform handover despite necessity of the handover. Use of various terminals including a mobile phone during driving is assumed as a cause of such information transmission failure.

For example, in a situation in which a driver is absorbed in voice calls or exchange of e-mails through a mobile phone, the possibility that a driver overlooks a message of the handover request generated by the system and the advance notice thereof, a message of the automatic braking activation, or the like becomes high. Therefore, it is difficult to ensure safety during vehicle driving.

Therefore, it is conceivable to adopt the technology of, for example, JP-A-2000-349895 or JP-A-2014-506081 to restrict the use of a mobile phone or the like. However, in a case of adopting the technology of JP-A-2000-349895, since the radio waves of a mobile phone are blocked while the vehicle is driven, the mobile phone cannot be used at all during driving. That is, even in a case of a vehicle equipped with a hands-free call function capable of relatively safe phone calling, the function cannot be used, and thus it is inevitable that the user's convenience deteriorates.

Further, in a case of adopting the technology of JP-A-2014-506081, the use of a mobile phone or the like is suddenly restricted when the use prohibition condition is satisfied. Therefore, it is considered that a driver is in a state of being confused with the grasp of the situation. In addition, confusion is also caused on the speech partner by the sudden function restriction. Therefore, it becomes difficult to ensure safety during vehicle driving and convenience also deteriorates.

One or more or aspects of the invention have been made in view of the circumstances described above and an object thereof is to provide an in-vehicle system capable of ensuring safety during vehicle driving and suppressing deterioration of convenience related to use of a mobile phone on a vehicle.

In order to achieve the above-described object, features of an in-vehicle system according to one or more aspects of the invention are summarized as the following items (1)-(5).

(1) An in-vehicle system mountable on a vehicle having an automated driving function for automatically controlling at least one of steering and a vehicle speed of the vehicle, the in-vehicle system including:

an information presentation unit configured to present information related to automated driving to a driver of the vehicle; and a call management unit connectable to a mobile terminal capable of wireless communication, wherein when a situation in which the information presentation unit presents information related to automated driving is detected, the call management unit automatically restricts an operation of the mobile terminal.

According to the in-vehicle system having the configuration of (1) described above, when the information presentation unit presents information related to automated driving in a situation where, for example, the handover is required or automatic braking is activated, the operation of the mobile terminal is restricted. Thus, it is possible for a driver to avoid overlooking important messages presented by the information presentation unit, thereby ensuring safety of driving. In addition, since a driver can grasp the situation by the message presented by the information presentation unit, there is no confusion in grasping the situation. Even when the vehicle is driven, it is possible to use a mobile phone or the like except when the information presentation unit presents information related to automated driving, so that it is possible to avoid deterioration in convenience of a user.

(2) The in-vehicle system according to (1) described above, wherein when it is expected that a first state where the operation of the mobile terminal should be restricted occurs, the call management unit presents advance notice information related to operation restriction of the mobile terminal at a time of a second state at least a certain time or a predetermined distance before the vehicle reaches the first state.

According to the in-vehicle system having the configuration of (2) described above, when, for example, a handover request is expected to occur, a message can be presented to a driver at the time of the second state at which a time margin is ensured with respect to the prediction. Therefore, a driver can prepare for the handover with a sufficient margin, and thus it is possible to smoothly perform the handover.

The in-vehicle system according to (1) or (2) described above, wherein when it is expected that the first state where the operation of the mobile terminal should be restricted occurs, the call management unit automatically switches an extent of the operation restriction of the mobile terminal according to an amount of a remaining time or distance until the vehicle reaches the first state.

According to the in-vehicle system having the configuration of (3) described above, since the operation of the mobile terminal can be restricted in stages, it is possible to prevent sudden operation restriction and avoid confusion of a driver.

(4) The in-vehicle system according to any one of (1) to (3), wherein when the operation of the mobile terminal is restricted or a restriction of the operation of the mobile terminal is expected, the call management unit automatically transmits information related to the restriction to a second terminal communicating with the mobile terminal.

According to the in-vehicle system having the configuration of (4) described above, it is possible to automatically notify a message related to communication restriction to a partner who is talking or communicating with a driver of the host vehicle. Therefore, the communication partner is not confused at the time of restricting the communication and such an unnecessary action that the communication partner calls back while communication is restricted can be avoided.

(5) The in-vehicle system according to (4) described above, wherein the call management unit executes communication restriction between the mobile terminal and the second terminal after a process for transmitting the information related to the restriction is finished.

According to the in-vehicle system having the configuration of (5) described above, since it is possible to reliably notify a message related to communication restriction to a partner who is talking or communicating with a driver of the host vehicle, it is easy to grasp the situation even in a case of communication restriction, and thus it is possible to avoid deterioration in convenience of a user.

According to the in-vehicle system of one or more aspects of the invention, it is possible to ensure safety during vehicle driving and suppress deterioration in convenience related to use of a mobile phone on a vehicle or the like.

As described above, one or more aspects of the invention are briefly described. Furthermore, the details of one or more aspects of the invention will be further clarified by reading a mode for carrying out the invention (hereinafter, referred to as "embodiment") described below with reference to the accompanying drawings.

DETAILED DESCRIPTION

A specific embodiment related to the invention will be described below with reference to the respective drawings.

Configuration Example of Main Parts of In-Vehicle System

Figure 1:
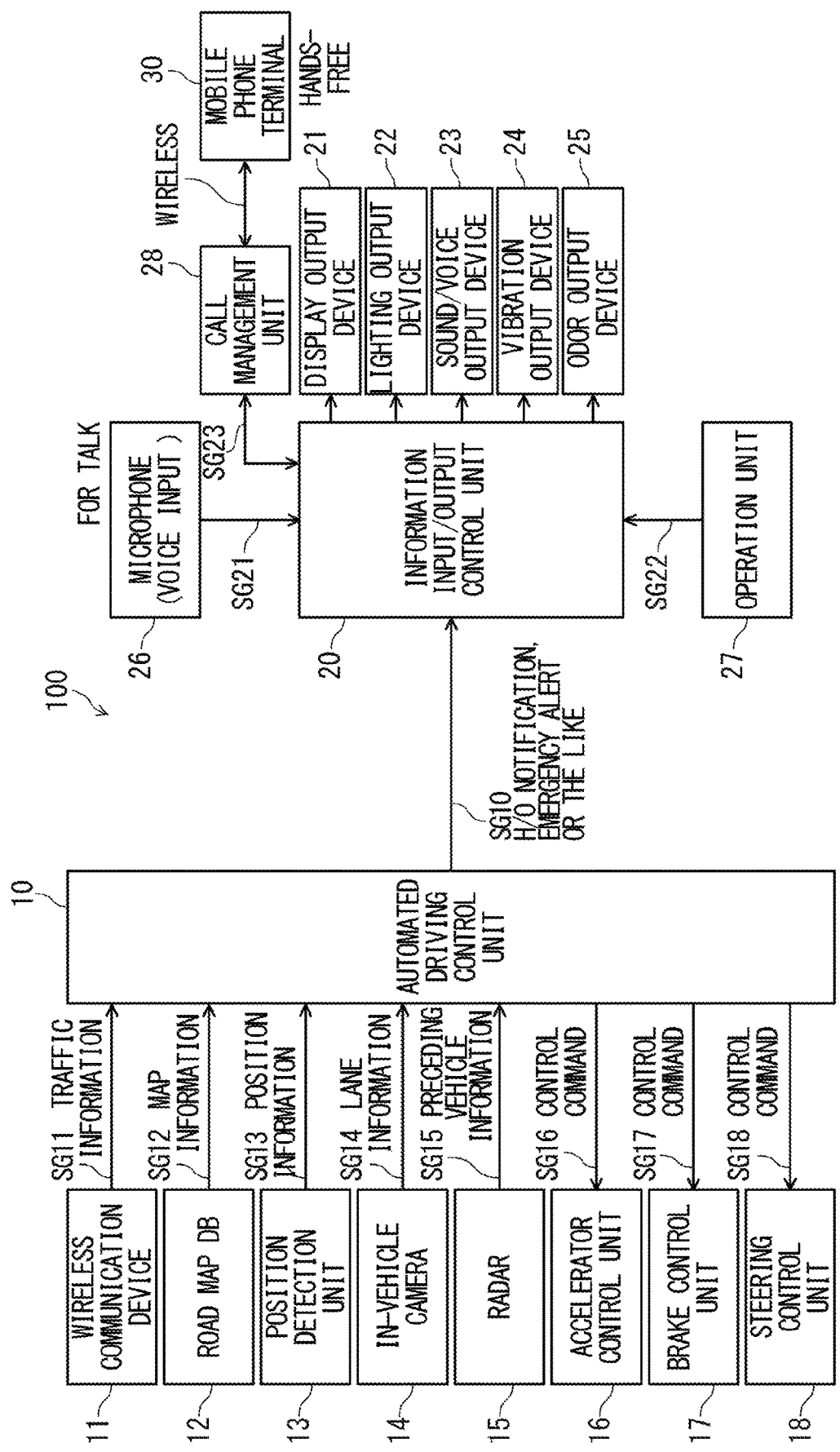
FIG. 1 is a block diagram illustrating a configuration example of main parts of an in-vehicle system.

A configuration example of main parts of an in-vehicle system 100 is illustrated in FIG. 1. The in-vehicle system 100 includes an automated driving function for a car, a function for presenting information related to automated driving to a driver, and a function for managing a hands-free call of a mobile phone terminal 30.

The in-vehicle system illustrated in FIG. 1 includes an automated driving control unit 10, a wireless communication device 11, a road map database (DB) 12, a position detection unit 13, an in-vehicle camera 14, a radar 15, an accelerator control unit 16, a brake control unit 17, and a steering control unit 18 as components necessary for automated driving of a car.

By being connected with a predetermined server outside a vehicle by wireless communication, the wireless communication device 11 can acquire weather information, traffic information, or the like at each place in front of a road in a travelling direction on which a host vehicle is currently travelling. The weather information, the traffic information, and the like acquired by the wireless communication device 11 are input to the automated driving control unit 10 as input information SG11.

The road map database 12 accumulates in advance and holds a wide range of road maps including the road on which the host vehicle is currently travelling and various types of information related to the road. Information such as a map held by the road map database 12 is input to the automated driving control unit 10 as input information SG12.

The position detection unit 13 can calculate the latest position information representing the current position of the host vehicle by receiving and using radio waves from, for example, Global Positioning System (GPS) satellites. The position information is input to the automated driving control unit 10 as input information SG13.

The in-vehicle camera 14 can capture images showing the respective circumstances of surroundings, for example, the front, rear, and lateral directions of the host vehicle in the travelling direction and can output image signals. The video signal is input to the automated driving control unit 10 as input information SG14.

The radar 15 can detect the presence or absence of an obstacle such as a preceding vehicle and the distance between the preceding vehicle and the host vehicle by using a detection function using a radio wave such as a millimeter wave. The detection information of the radar 15 is input into the automated driving control unit 10 as input information SG15.

The accelerator control unit 16 has an electrically controllable actuator necessary for automatically adjusting an accelerator opening degree of the host vehicle. The accelerator control unit 16 can adjust the accelerator opening in accordance with control command SG16 output by the automated driving control unit 10.

The brake control unit 17 includes an electrically controllable actuator connected to a brake mechanism of the host vehicle. The brake control unit 17 can control the on/off and braking force of the brake of the host vehicle in accordance with control command SG17 output by the automated driving control unit 10.

The steering control unit 18 has an electrically controllable actuator connected to a steering mechanism of the host vehicle. The steering control unit 18 can move the steering mechanism of the host vehicle or generate an assisting torque for assisting the steering force of the driver in accordance with control command SG18 output by the automated driving control unit 10.

The automated driving control unit 10 is an electronic control unit (ECU) for controlling the automated driving of the car and is equipped with functions corresponding to automated driving of the level 2 (LV2) or the level 3 (LV3) of the automation level prescribed by, for example, the Government of Japan or United States Department of transportation's National Highway Traffic Safety Administration (NHTSA). Further, in addition to the general automated driving function, a function of performing braking control of a pre-crash safety system as an emergency system is also installed in the automated driving control unit 10.

The pre-crash safety system determines the possibility of the host vehicle colliding with an object based on the object information (distance, direction, relative speed, and the like) obtained from the radar 15 of millimeter waves and the in-vehicle camera 14 and automatically applies a brake to the host vehicle when it is determined that there is a high possibility that the host vehicle will collide with the object.

At the level 2 of the automated driving function, the system automatically carries out a plurality of operations among acceleration, steering, and braking of the vehicle. However, at the level 2, it is necessary for a driver to constantly monitor the driving situation and carry out the driving operation as necessary.

On the other hand, at the level 3, the system performs all the control of acceleration, steering, and braking of the vehicle, and thus usually a driver only has to monitor the driving situation. Also, it is not absolutely necessary for a driver to monitor the situation. However, even in the case of the level 3, when the system sends a request in the event of emergency or system accuracy deterioration, it is necessary for a driver to respond to the request. In other words, it is necessary to hand over the responsibility of driving from the system to the manual operation of a driver and shift the automated driving level from the level 3 to the level 2 or the like having a lower automation rate than that or the level 3. Further, even in the same level, there may be a case where, during automated driving of the host vehicle, when the hand touches the steering wheel, the driver takes charge of monitoring, and the vehicle is shifted from a travelling state in which assistance by a driver is unnecessary to a travelling state in which assistance is necessary, such as one of these, i.e., start of lane change starting from a winker operation, and driver's approval for system decision. In other words, there are cases where the state shifts from a first state in which the driving control is automatically executed to a second state in which the degree of involvement in the driving control by a driver is greater than that of the first state.

The automated driving control unit 10 can perform acceleration control of the host vehicle by giving instructions to the accelerator control unit 16 using the control command SG16. In addition, the automated driving control unit 10 can perform braking control of the host vehicle by giving instructions to the brake control unit 17 using the control command SG17. Furthermore, the automated driving control unit 10 can perform steering control of the host vehicle by giving instructions to the steering control unit 18 using the control command SG18.

Further, the automated driving control unit 10 analyzes the image of the in-vehicle camera 14 to grasp each white line at the boundary of a travelling lane and the position of the host vehicle in a right-left direction, in such a manner that the automated driving control unit 10 can calculate the appropriate position of the host vehicle in the right-left direction and can grasp the condition of the curve of the road ahead of the vehicle. Therefore, the automated driving control unit 10 can realize, for example, a lane keeping assistance function for automatically controlling the host vehicle to travel on the central position of the travelling lane on the road.

Further, the automated driving control unit 10 can automatically perform acceleration and deceleration based on a result of analyzing the image of the in-vehicle camera 14 and the position and distance information of a preceding vehicle detected by the radar 15 so that, for example, the inter-vehicle distance between the preceding vehicle and the host vehicle is maintained within a safe range. That is, an Adaptive Cruise Control System (ACC) can be realized.

Further, the automated driving control unit 10 can calculate an appropriate travelling route on the road on which the host vehicle should travel or can predict a change in the condition of the road ahead of the vehicle based on a predetermined target point, the current position detected by the position detection unit 13, the road map of the road map database 12, the traffic information acquired by the wireless communication device 11 and the like. In addition, by reflecting the analysis result of the actual image of the in-vehicle camera 14, prediction accuracy can be improved.

The automated driving control unit 10 can perform a handover from the level 3 to the level 2 or the like having a lower automation rate than that of the level 3 by accepting an automated/manual switching instruction generated by the driver's switch operation or the like or detecting the start of the manual driving operation by a driver.

The automated driving control unit 10 can detect a situation where it is difficult to ensure safety based on the analysis result of the image of the in-vehicle camera 14, the distance information detected by the radar 15, and the like. It is possible to detect the situation where it is difficult to ensure safety by grasping, for example, the time margin based on the remaining time TTC (Time To Collision) or the like up to the time when there is a possibility that the host vehicle may come into contact with another vehicle existing in the vicinity thereof. The time TTC can be calculated by, for example, the equation as follows:

TTC=(distance between host vehicle and target object)/(relative speed)

Therefore, when the automated driving control unit 10 detects a situation where it is difficult to ensure safety, the automated driving control unit 10 outputs a signal representing a request for handover as notification information SG10. The notification information SG10 may include information indicating the type of event that is predicted or a notification indicating the brake operation of the pre-crash safety system. The notification information SG10 is input to the information input/output control unit 20.

The information input/output control unit 20 is an electronic control unit (ECU) which performs a control for realizing a function of presenting necessary information to a driver at the time of automated driving or a function related to a hands-free call of the mobile phone terminal 30. The automated driving control unit 10 and the information input/output control unit 20 illustrated in FIG. 1 may be integrated.

The mobile phone terminal 30 is a terminal which is a user's possession brought into the vehicle and used by a user such as a driver as necessary. Further, the in-vehicle system 100 provides the function of a hands-free call to the mobile phone terminal 30 so that a safe call can be made even while the host vehicle is driven. Therefore, the mobile phone terminal 30 is connected to the information input/output control unit 20 via a call management unit 28. The information input/output control unit 20 and the call management unit 28 are connected by wires and the call management unit 28 and the mobile phone terminal 30 are wirelessly connected using, for example, Bluetooth (registered trademark) or the like.

In a case of using the function of the hands-free call, the mobile phone terminal 30 can transmit voice information SG21 input from a microphone 26 to the partner terminal. Further, it is possible to remotely operate the mobile phone terminal 30 by using a touch panel or a switch provided in an operation unit 27. Further, the mobile phone terminal 30 can output voice information and ringing tones during a phone call as sound from a speaker of a sound/voice output device 23.

When a hands-free call is made with the mobile phone terminal 30, the call management unit 28 has a function of performing wireless connection of the mobile phone terminal 30, outgoing call, incoming call, telephone conversation, disconnection of a telephone line, and the like. When the mobile phone terminal 30 uses a hands-free call, the information input/output control unit 20 of the embodiment can provide a call function to a user in a state where the safety of driving is ensured by linking with the automated driving control unit 10 and the call management unit 28.

A display output device 21 corresponds to a display device arranged at such a position that an occupant driving a vehicle in a driver's seat can easily view it, such as a meter unit or a center display mounted on the vehicle.

A lighting output device 22 corresponds to various kinds of interior lighting equipment installed in a vehicle. The sound/voice output device 23 corresponds to various auditory output devices including an audio device and the like. A vibration output device 24 is a device capable of generating mechanical vibration by electrical control. The vibration output device 24 is attached or connected to the seating portion of the driver's seat or the steering wheel so that a driver can recognize the vibration as a tactile sensation or the like during driving.

An odor output device 25 is a device capable of generating a specific odor in the passenger compartment by electrical control. This odor output device 25 is installed in, for example, a car air conditioner and it can spray air freshener and spread the smell to the space inside the passenger compartment by blowing.

In accordance with the notification information SG10 input from, for example, the automated driving control unit 10, the information input/output control unit 20 can select one of the display output device 21, the lighting output device 22, the sound/voice output device 23, the vibration output device 24, and the odor output device 25 or combine a plurality of them to present the necessary information to a driver. By appropriately using various types of output devices as necessary, the information input/output control unit 20 can present information in various kinds of forms and can adjust the intensity of information presentation.

Example of Operation Pattern for Call Management

Figure 2:
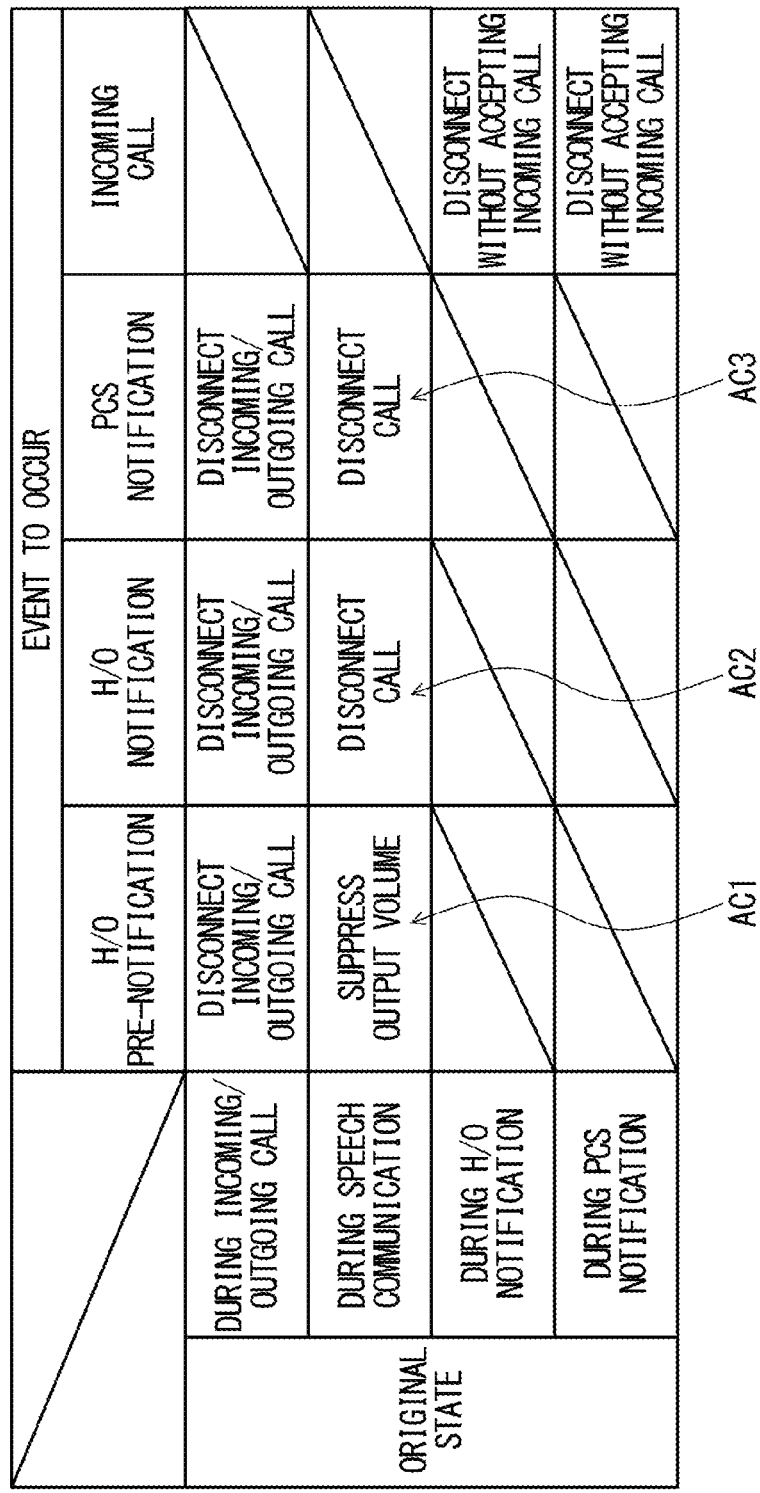
FIG. 2 is a schematic diagram illustrating a configuration example of a table which defines an operation pattern of the in-vehicle system.

FIG. 2 illustrates a configuration example of a table which defines the operation pattern of the in-vehicle system 100. That is, for example, the information input/output control unit 20 controls a hands-free call of the mobile phone terminal 30 according to the operation pattern defined in the table of FIG. 2 to ensure the safety of driving of the host vehicle.

In the table illustrated in FIG. 2, the operation contents corresponding to the combination of the original state before the occurrence of the event and the type of the event that has occurred are defined. In this example, there are four types of original states: incoming/outgoing phone call, speech communication, handover notification, and pre-crash safety system notification and there are four types of events to occur: handover pre-notification, handover notification (request), pre-crash safety system notification, and incoming call.

The original state before the event occurs is managed by the information input/output control unit 20. Further, the handover pre-notification, the handover notification, and the pre-crash safety system notification are notified from the automated driving control unit 10 to the information input/output control unit 20 as the notification information SG10. The event of an incoming call is notified from the call management unit 28 to the information input/output control unit 20 by communication control information SG23.

In the example of the table illustrated in FIG. 2, there are defined as follows:

(1) When an event of the handover pre-notification occurs at the time of the incoming or outgoing call, automatic termination of the incoming or outgoing call is performed.

(2) When an event of the handover pre-notification occurs during speech communication, the output volume (speech voice or ringing tone) is suppressed.

(3) When an event of the handover notification (request) occurs at the time of the incoming or outgoing call, automatic termination of the incoming or outgoing call is performed.

(4) When an event of the handover notification (request) occurs during speech communication, automatic disconnection of the call is made or transition to a holding state is performed. Actually, before the disconnection or the like, a guidance message is transmitted to the speech partner.

(5) When an event of the operation notification of the pre-crash safety system occurs at the time of the incoming or outgoing call, automatic termination of the incoming or outgoing call is performed.

(6) When an event of the operation notification of the pre-crash safety system occurs during speech communication, automatic disconnection of the call is made or transition to a holding state is performed. Actually, before the disconnection or the like, a guidance message is transmitted to the speech partner.

(7) When an event of the incoming call occurs during the handover notification, the line is automatically disconnected without accepting the incoming call.

(8) When an event of the incoming call occurs during the operation notification of the pre-crash safety system, the line is automatically disconnected without accepting the incoming call.

The time at which the handover pre-notification occurs is, for example, three minutes before the scheduled time at which the handover is required. The time at which the handover notification occurs is, for example, 10 seconds before the scheduled time at which the handover is required. In other words, when the system (automated driving control unit 10) predicts the occurrence of a situation requiring the handover based on the road conditions and the like, the system generates the handover pre-notification and the handover notification at an appropriate predetermined time while considering the remaining time or distance until the vehicle actually reaches the corresponding point. Of course, the time may be changed as necessary. Also, the time at which the pre-crash safety system notification occurs is immediately before (two to three seconds before) the collision occurs.

Specific Content of Control of Call Management

Figure 3:
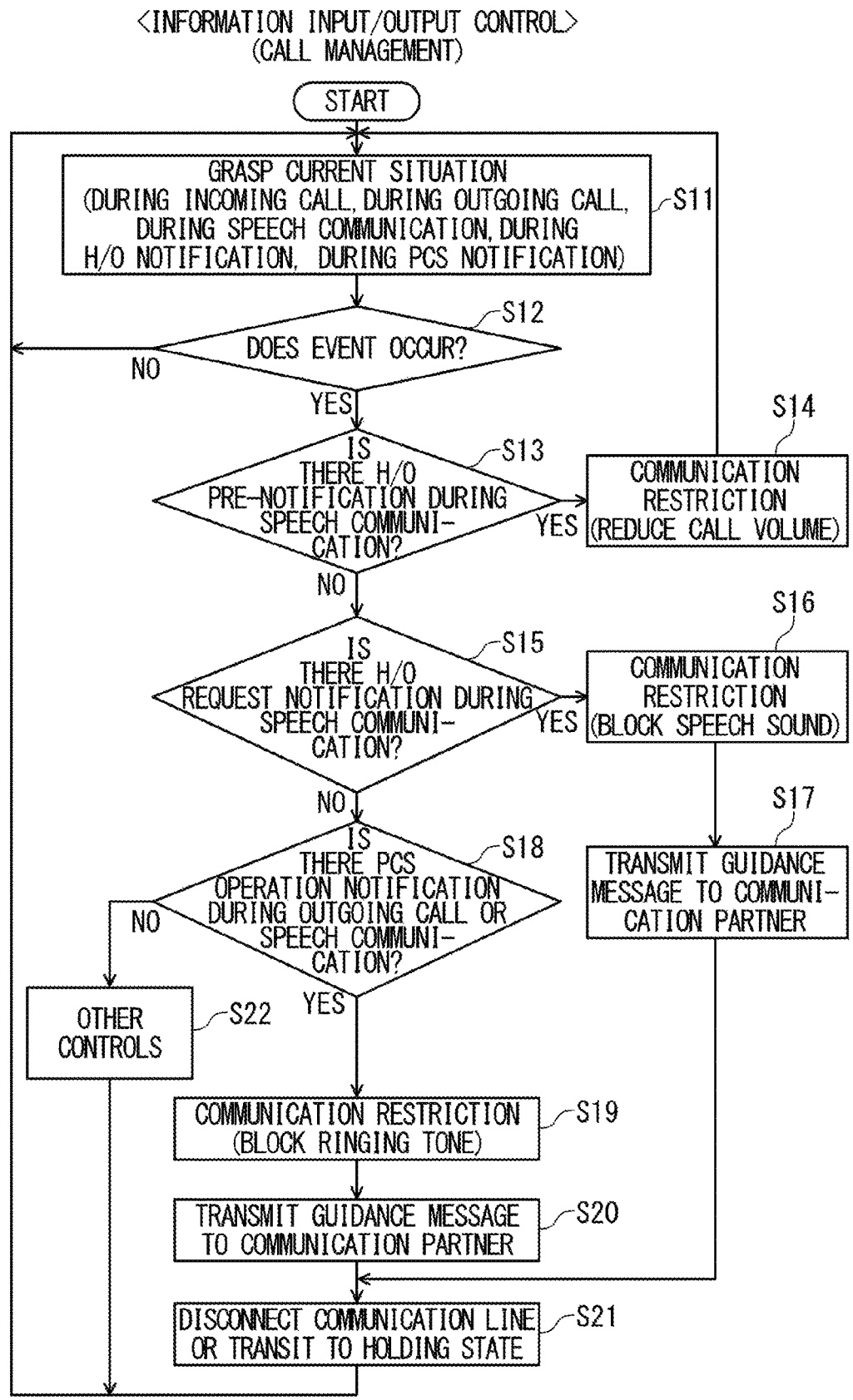
FIG. 3 is a flowchart illustrating an operation example of information input/output control for managing a call.

FIG. 3 illustrates an operation example of information input/output control for managing a call. For example, the information input/output control unit 20 illustrated in FIG. 1 executes the operation of FIG. 3. Therefore, in accordance with the operation pattern defined in the table as illustrated in FIG. 2, appropriate call management is performed according to the combination of the current state and the event that has occurred. A case where the information input/output control unit 20 executes the operation illustrated in FIG. 3 will be described below.

The information input/output control unit 20 always grasps the current situation by monitoring the notification information SG10 and the communication control information SG23 (S11). That is, respective states such as during handover notification (including pre-notification), during pre-crash safety system notification, during incoming call, during outgoing call, and during speech communication of the mobile phone terminal 30 are distinguished. Thus, the original state in the table illustrated in FIG. 2 can be specified.

Further, the information input/output control unit 20 monitors the notification information SG10 and the communication control information SG23, thereby identifying the occurrence of a new event (S12). When the occurrence of a new event is detected, the process proceeds to S13 and subsequent steps.

Then, when an event of the handover pre-notification occurs during speech communication, the information input/output control unit 20 proceeds from S13 to S14. Next, communication restriction is applied to the hands-free call use of the mobile phone terminal 30. The specific communication restriction in this case is reduction of the call volume. That is, although the users (a driver and a speech partner) can still continue the call, the users talk while being conscious that the call is scheduled to be interrupted after a few minutes due to the recognition of the volume reduction. At the same time, a notification sound indicating that the handover pre-notification has been generated is output or attention is attracted using the screen display. A specific example will be explained below.

On the other hand, when an event of the handover notification (request) occurs during speech communication, the information input/output control unit 20 proceeds from S15 to S16. Next, communication restriction is applied to the hands-free call use of the mobile phone terminal 30. The specific communication restriction in this case is cutting-off of the speech sound. Therefore, in this case, the user's call is forcibly terminated. Therefore, a driver does not need to be conscious of the call, so it becomes easy to recognize the handover notification (request) that has occurred, and thus it is possible to respond to the handover request.

Actually, a few minutes before the occurrence of the handover notification (request), a driver has already recognized the occurrence of the handover pre-notification. Therefore, it is possible to smoothly perform the handover in response to the handover request.

At the subsequent S17 executed almost at the same time as S16, the information input/output control unit 20 sends a guidance message, that is, information on the disconnection guidance, indicating that the call is interrupted to the terminal of the call partner.

Therefore, when the handover request occurs, the call partner who is talking with the driver of the host vehicle is also subjected to the call interruption in a state where the call partner reliably recognizes that the call is interrupted. Therefore, it is possible to avoid the occurrence of such an unnecessary action that the call partner calls back after the call is automatically interrupted, and thus the convenience is improved.

Although not illustrated in the operation of FIG. 3, when the handover notification (request) occurs, a message indicating a request for handover is output by the screen display or the like so that a driver can easily view it. This message is output using a display on a meter unit of a vehicle, a head-up display (HUD), a display of a next generation In-Vehicle Infotainment system (IVI), or the like. By visually recognizing the message, the driver recognizes that it is necessary to switch the driving mode to the manual driving and starts the operation of the manual driving. As a result, the handover is executed.

After finishing the transmission of the guidance message in S17, the information input or output control unit 20 controls the call management unit 28 in S21 and performs disconnection of the telephone line or transition to the holding state.

On the other hand, when an event of the pre-crash safety system notification occurs at the time of the incoming/outgoing call by the mobile phone terminal 30, the information input/output control unit 20 proceeds from S18 to S19. Then, communication restriction is applied to the hands-free call use of the mobile phone terminal 30. The specific communication restriction in this case is cutting-off of the ringing tone. Therefore, in this case, even when there is an incoming call, the ringing tone does not sound so that a driver is not conscious of the incoming call and can easily grasp the pre-crash safety system notification. In other words, since a driver can immediately recognize that the brake is activated by the pre-crash safety system, the driver will not panic against sudden deceleration of the host vehicle, and thus safety can be ensured.

Further, in this case, the information input/output control unit 20 sends a predetermined guidance message to the terminal of the communication partner whose call is received at the subsequent S20. Specifically, the communication partner is notified that the driver of the host vehicle is in a state where he/she cannot currently make a call. Therefore, the communication partner can call back at a later time if necessary. Also, in this case, after finishing the transmission of the guidance message in S20, the information input/output control unit 20 controls the call management unit 28 in S21 and performs disconnection of the telephone line or transition to the holding state.

Other operation patterns except for those illustrated in the table of FIG. 2 can also be similarly processed in Step S22 of FIG. 3. That is, when the handover pre-notification or the handover notification (request) occurs in a state of incoming call or outgoing call in accordance with the contents of each operation pattern defined in the table of FIG. 2, communication restriction (ringing tone disconnection) is performed as similar to S19 to S21 and a guidance message is sent, and then automatic disconnection of the outgoing call or incoming call or transition to a holding state is performed.

When the pre-crash safety system notification occurs during speech communication, communication restriction (cutting-off the speech sound) is performed as similar to S16, S17, and S21 and a guidance message is sent, and then automatic disconnection of the outgoing call or incoming call or transition to a holding state is performed. Also, when an event of the incoming call occurs during the handover notification or pre-crash safety system notification, the line is disconnected without accepting the incoming call.

It is assumed that, regarding the conditions for releasing respective actions AC1 to AC3 in FIG. 2 which are executed with the occurrence of the respective events, it is set to, for example, the time after a certain period of time has elapsed or the time after a predetermined cancellation notification has occurred.

Specific Example of State Change of Each Part of System_1

Figure 4:
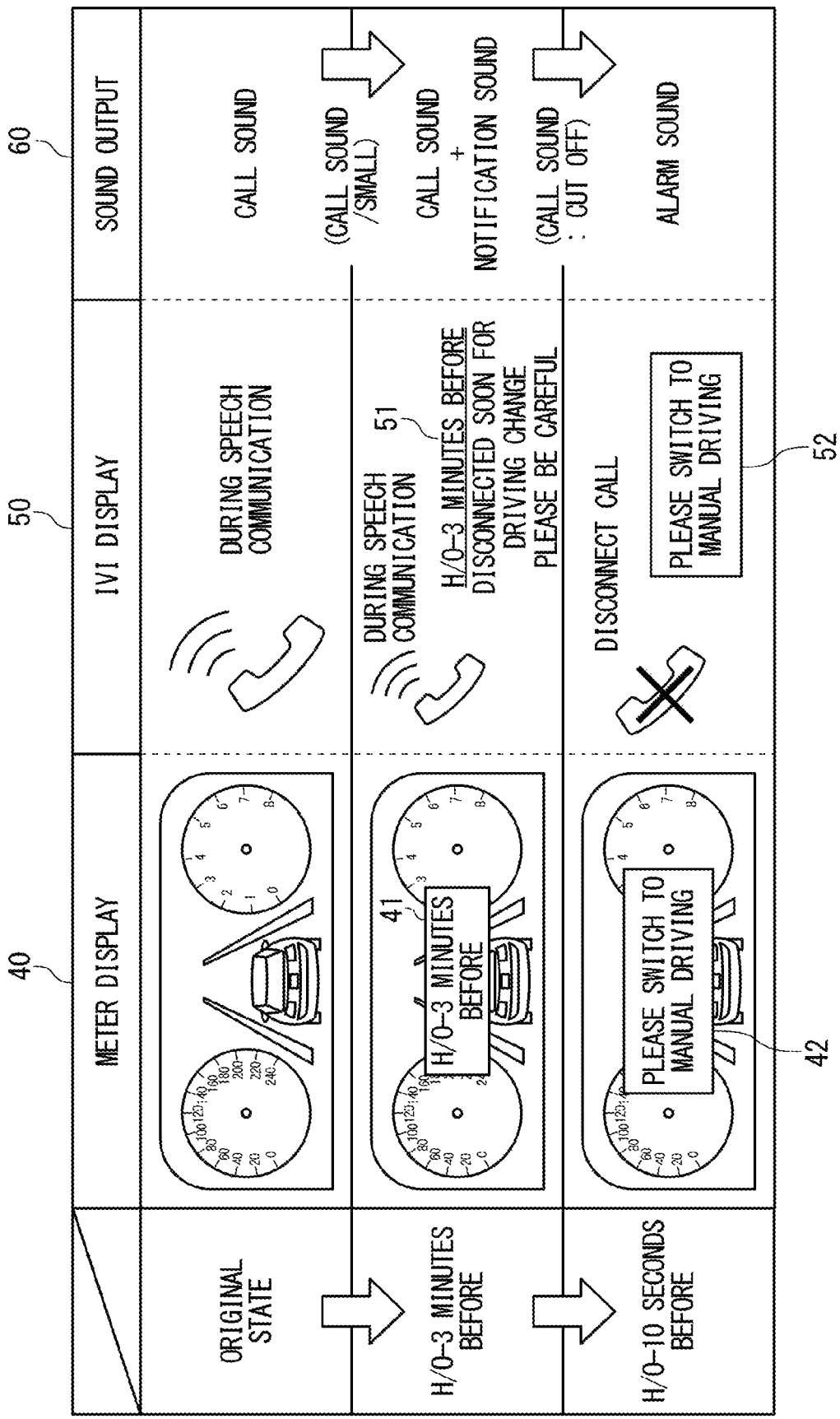
FIG. 4 is a state transition diagram illustrating an example of a state change of each part when a handover request occurs during a call.

An example of a state change of each part when the handover request occurs during speech communication is illustrated in FIG. 4. That is, FIG. 4 illustrates the state change of each part of the system corresponding to the actions AC1 and AC2 defined in the table illustrated in FIG. 2. Further, in this example, it is assumed that a meter display screen 40, an IVI display screen 50, and a sound output unit 60 are included in the system and those can be controlled by the information input/output control unit 20.

When "original state" is in a state of speech communication and other events have not yet occurred, the meter display screen 40 outputs normal display contents and the IVI display screen 50 displays a message of "during speech communication", and further the sound output unit 60 outputs the speech sound at normal volume as illustrated in the upper part of FIG. 4. When an event of the handover pre-notification occurs in the state described above, the state is shifted to the state illustrated in the middle part of FIG. 4 as "H/O 3 minutes before".

That is, in the state of "H/O-3 minutes before", the meter display screen 40 displays a message of a handover announcement display 41. Further, in addition to "during speech communication", the IVI display screen 50 displays a message which shows that it is three minutes before the scheduled handover and notifies that the call is about to be disconnected soon. The sound output unit 60 reduces the volume of the speech sound lower than usual and outputs the notification sound indicating the handover notification in a state where the notification sound is superimposed on the speech sound. When an event of the handover notification (request) occurs after about three minutes have elapsed from the state described above, the state is shifted to the state illustrated in the lower part of FIG. 4 as "H/O-10 seconds before".

That is, in a state of "H/O-10 seconds before", the meter display screen 40 displays a handover request message 42. Also, the IVI display screen 50 displays a handover request message 52 including a message indicating that the call has been disconnected. In addition, the sound output unit 60 shuts down the output of the speech sound and outputs an alarm sound representing a request for the handover.

In a state of "H/O-10 seconds before" in the lower part of FIG. 4, a driver recognizes the content of at least one of the meter display screen 40, the IVI display screen 50, and the sound output unit 60, in such a manner that the driver can reliably understand that switching to manual driving is necessary and can start the operation of the manual driving. When the driver starts the operation of the manual driving, the handover is executed. Also, since, about three minutes before the time described above, the occurrence of the handover is predicted in a state of the middle part of FIG. 4, a driver can prepare for the handover with a sufficient margin before the state becomes the state of "H/O-10 seconds before", and thus the smooth handover can be easily executed.

Specific Example of State Change of Each Part of System_2

Figure 5:
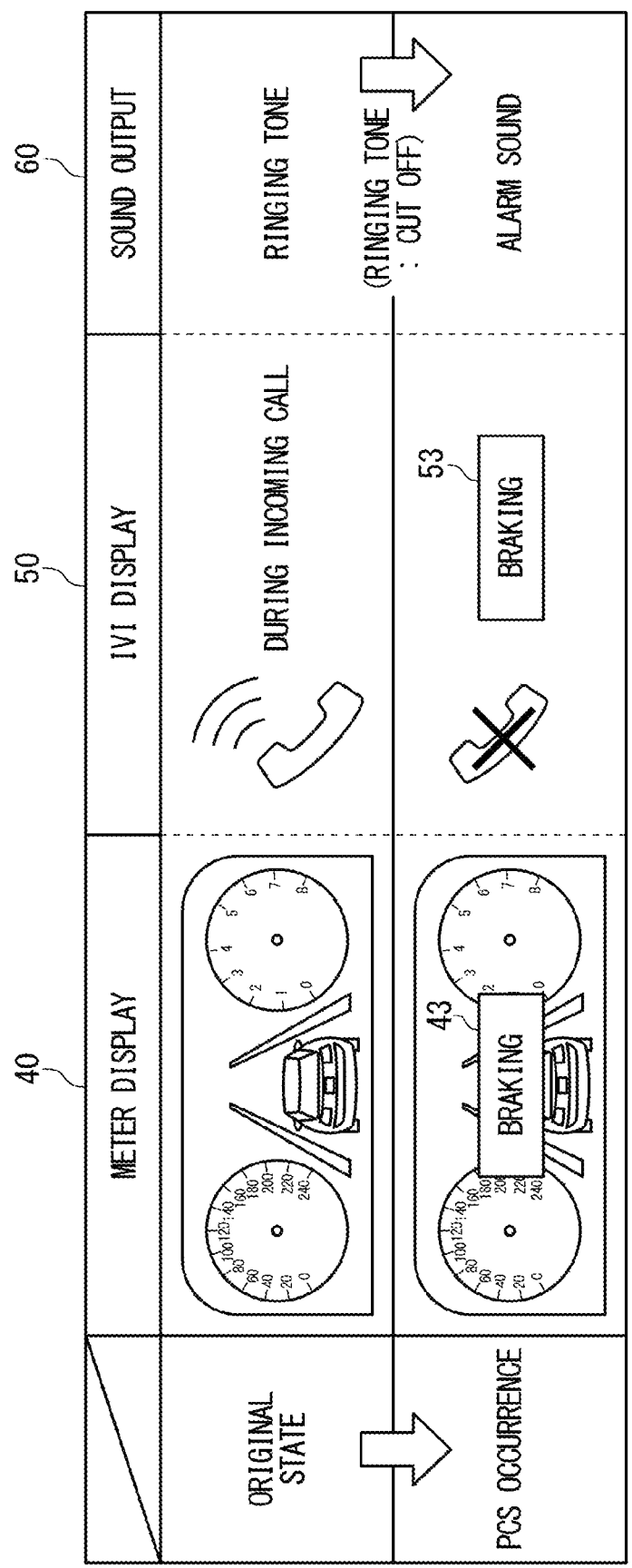
FIG. 5 is a state transition diagram illustrating an example of a state change of each part when a brake of a pre-crash safety system is activated during an incoming call.

An example of a state change of each part when the brake of the pre-crash safety system is activated during incoming call is illustrated in FIG. 5. That is, FIG. 5 illustrates the state change of each part of the system corresponding to the action AC3 defined in the table illustrated in FIG. 2. In this example, it is assumed that the meter display screen 40, the IVI display screen 50, and the sound output unit 60 are included in the system and those can be controlled by the information input/output control unit 20.

When "original state" is in a state of incoming call and other events have not yet occurred, the meter display screen 40 outputs normal display contents and the IVI display screen 50 displays a message of "incoming call", and further the sound output unit 60 outputs the ringing tone at normal volume as illustrated in the upper part of FIG. 5. When an event of the pre-crash safety system notification occurs in the state described above, the state is shifted to the state illustrated in the lower part of FIG. 5 as "PCS occurrence".

That is, in a "PCS occurrence" state, the meter display screen 40 displays an emergency brake operation indication 43. Also, the IVI display screen 50 displays the emergency brake operation indication 53. Further, the sound output unit 60 shuts off the output of the ringing tone and outputs an alarm sound to attract attention. Therefore, a driver can easily recognize that the host vehicle suddenly decelerates by the operation of emergency braking.

Specific Example of Operation Sequence_1

Figure 6:
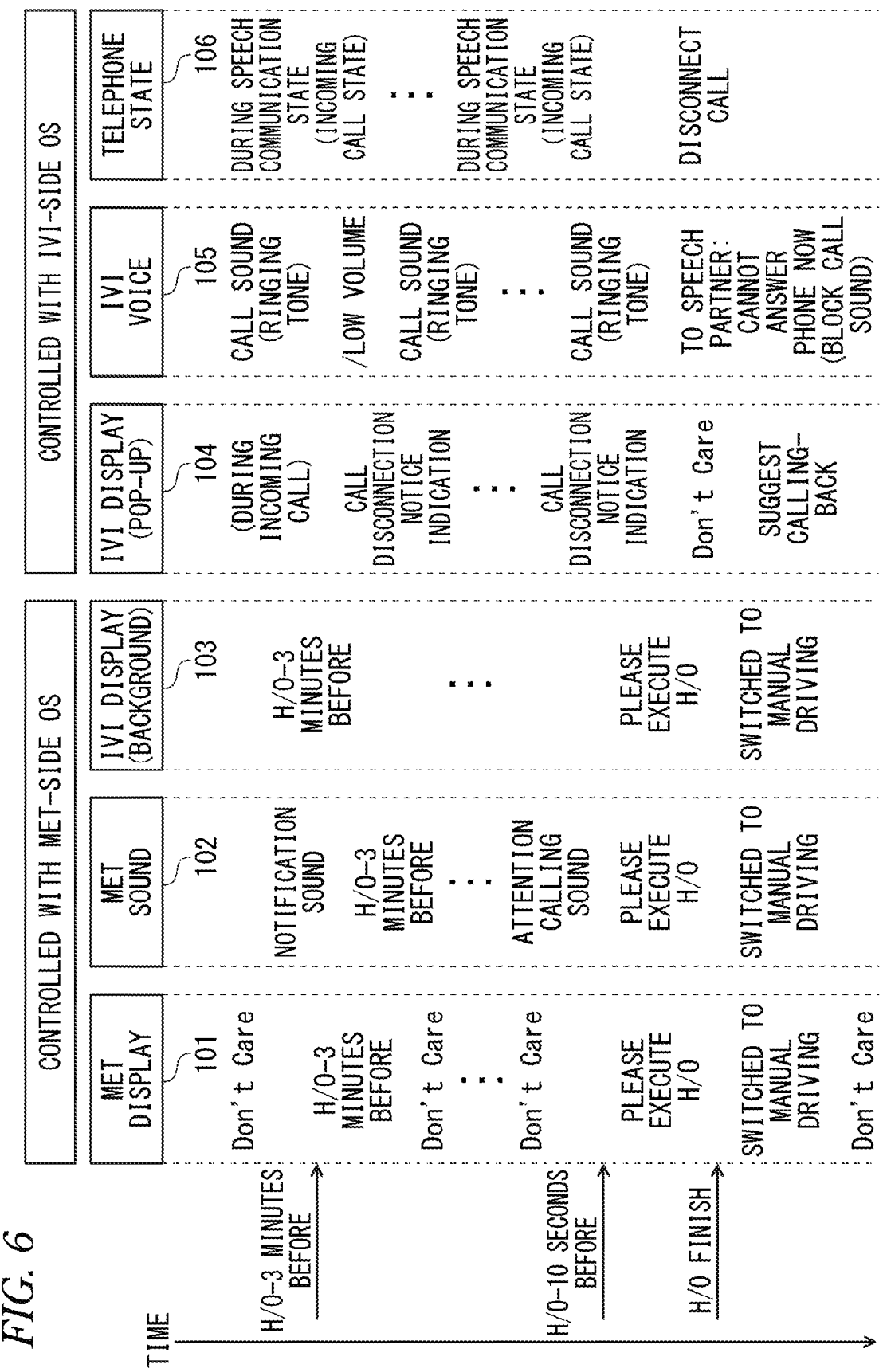
FIG. 6 is a sequence diagram illustrating an operation example of each part when a handover request occurs during a call.

An example of a detailed operation sequence when the handover request occurs during speech communication is illustrated in FIG. 6. That is, the flow of operations of a meter (MET) display control 101, a meter sound control 102, an WI background display control 103, an IVI pop-up display control 104, an IVI sound control 105, and a telephone state 106 when the operations corresponding to the actions AC1 and AC2 defined in the table illustrated in FIG. 2 are executed is illustrated in FIG. 6.

In the example of FIG. 6, it is assumed that the meter display control 101, the meter sound control 102, and the IVI background display control 103 are controlled by basic software (operating system: OS) which controls an electronic control unit built in the meter unit. Further, it is assumed that the IVI pop-up display control 104, the IVI sound control 105, and the telephone state 106 are controlled by basic software which controls an electronic control unit built in the next generation In-Vehicle Infotainment system. The operation of FIG. 6 will be described below.

When an event of the handover pre-notification occurs as described above, the state becomes the state of "H/O-3 minutes before" in FIG. 6 and the respective parts are controlled as follows.

The meter display control 101 displays "H/O-3 minutes before".

The meter sound control 102 outputs a notification sound.

The IVI background display control 103 displays "H/O-3 minutes before".

The IVI pop-up display control 104 outputs a warning indication related to the pre-notification of call disconnection. That is, it notifies the pre-notification in advance before the call is actually cut off.

The IVI sound control 105 suppresses the volume of the speech sound and ringing tone lower than usual (temporarily). Therefore, for example, a message specially outputted as illustrated in the middle part of FIG. 4 is easily transmitted to a driver.

In the telephone state 106, the state of speech communication or incoming call is maintained.

When an event of the handover notification (request) occurs, the state becomes the state of "H/O-10 seconds before" in FIG. 6, so that the respective parts are controlled as follows.

The meter display control 101 displays "Please hand over driving from vehicle" or the like.

The meter sound control 102 outputs a pseudo voice such as "Please hand over driving from vehicle" together with the output of the attention calling sound.

The IVI background display control 103 displays "Please hand over driving from vehicle" or the like.

The IVI sound control 105 transmits a guidance message such as "Cannot answer the phone now" by a signal of a pseudo voice to the terminal of the speech partner and cuts off the speech sound.

When the IVI sound control 105 outputs the guidance message described above, "during speech communication" is maintained in the telephone state 106. However, the speech sound on the driver's side of the host vehicle is in a cut-off state and the speech partner can receive only the guidance message. After the transmission of the guidance message is finished, the telephone state 106 shifted to a call disconnection state or a holding state.

When a driver starts the operation of manual driving, the handover is executed and the state becomes the state of "H/O completion" in FIG. 6. The respective parts are controlled as follows.

The meter display control 101 displays a message of "Switched to manual driving".

The meter sound control 102 outputs a pseudo voice representing a message of "switched to manual driving".

The IVI background display control 103 displays a message of "Switched to manual driving".

The IVI pop-up display control 104 displays a proposal message for calling back the disconnected call or performing a restoring operation of the call that has shifted to a holding state.

Specific Example of Operation Sequence_2

Figure 7:
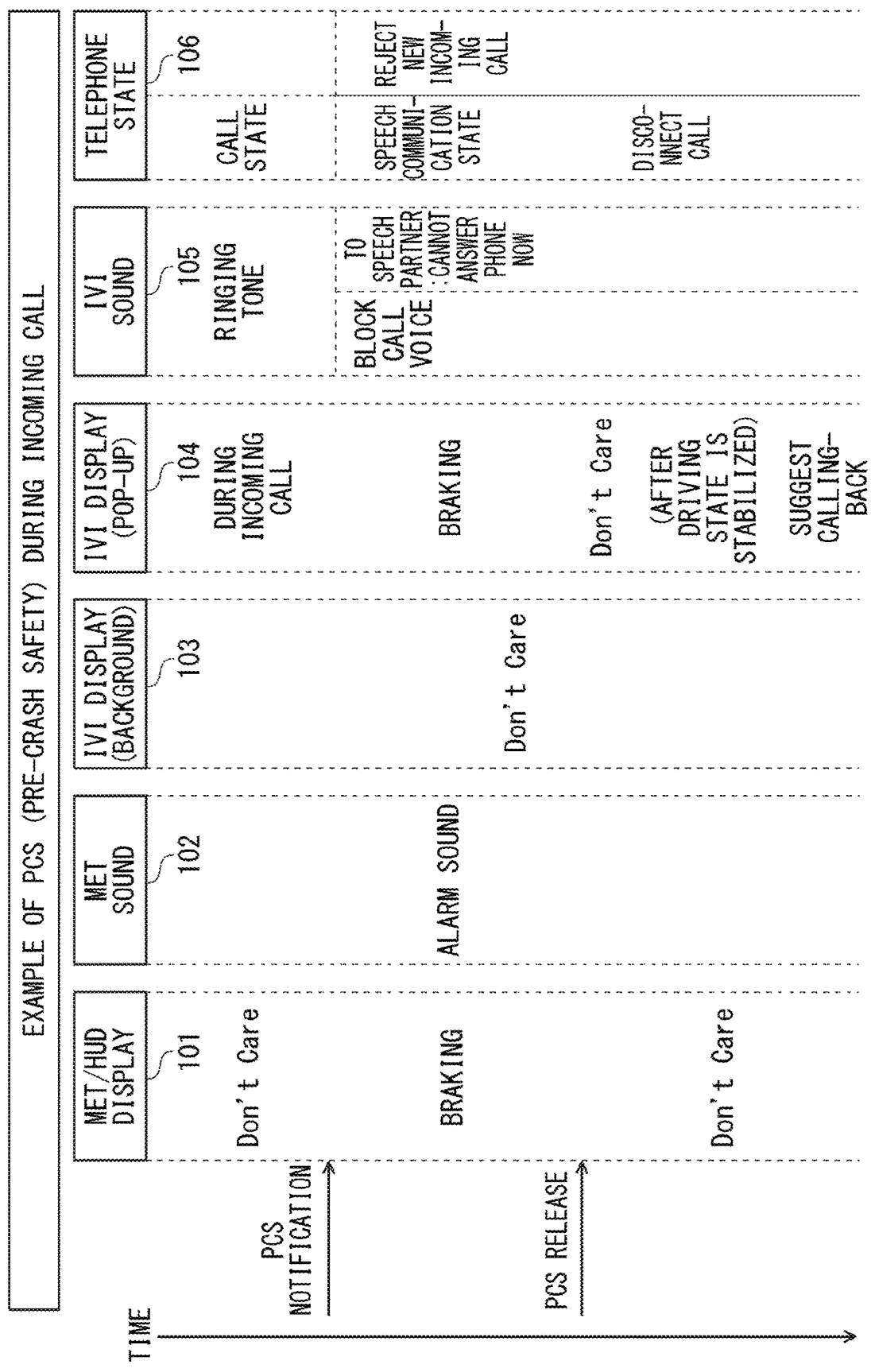
FIG. 7 is a sequence diagram illustrating an operation example of each part when the brake of the pre-crash safety system is activated during the incoming call.

An example of the detailed operation sequence when the brake of the pre-crash safety system is activated during incoming call is illustrated in FIG. 7. That is, the flow of operations of the meter (MET/HUD) display control 101, the meter sound control 102, the IVI background display control 103, the IVI pop-up display control 104, the IVI sound control 105, and the telephone state 106 when the operations corresponding to the action AC3 defined in the table illustrated in FIG. 2 are executed is illustrated in FIG. 7. The operations of FIG. 7 will be described below.

During incoming call in the mobile phone terminal 30 in a situation before the pre-crash safety system notification occurs, the IVI pop-up display control 104 displays a message of "Incoming call" and the IVI sound control 105 outputs the ringtone at usual state. Also, the telephone state 106 is in a call state.

When the pre-crash safety system notification occurs during the incoming call as described above, the state becomes the state of "PCS notification" in FIG. 7 and the respective parts are controlled as follows.

The meter display control 101 displays a message indicating "brake operation" in the display area of the meter display screen 40 or a head-up display.

The meter sound control 102 outputs an alarm sound representing "brake operation".

The IVI pop-up display control 104 displays a message indicating "brake operation" as similar to the emergency brake operation indication 53 of the IVI display screen 50 in FIG. 5.

The IVI sound control 105 cuts out the output of the speech voice on both the vehicle and the speech partner and transmits a guidance message of "Cannot answer the phone now" to the terminal of the speech partner.

In this case, in the telephone state 106, although the call state is still maintained, a new incoming call is rejected. Also, since the speech voice is blocked, the driver of the host vehicle feels like the phone is disconnected, but the telephone line is connected. By recognizing the guidance message transmitted on the line, the speech partner can grasp the state in which the call is interrupted due to the circumstances of the driver's side.

The telephone state 106 shifts to the disconnection state or the holding state after the transmission of the guidance message described above is completed.

Also, when a release notification of the pre-crash safety system occurs, the IVI pop-up display control 104 outputs a message indicating the content of proposing calling-back of the disconnected call or returning of the call in a holding state to the original state after the driving state of the host vehicle is stabilized.

Examples of Various Automated Driving Function

Figure 8:
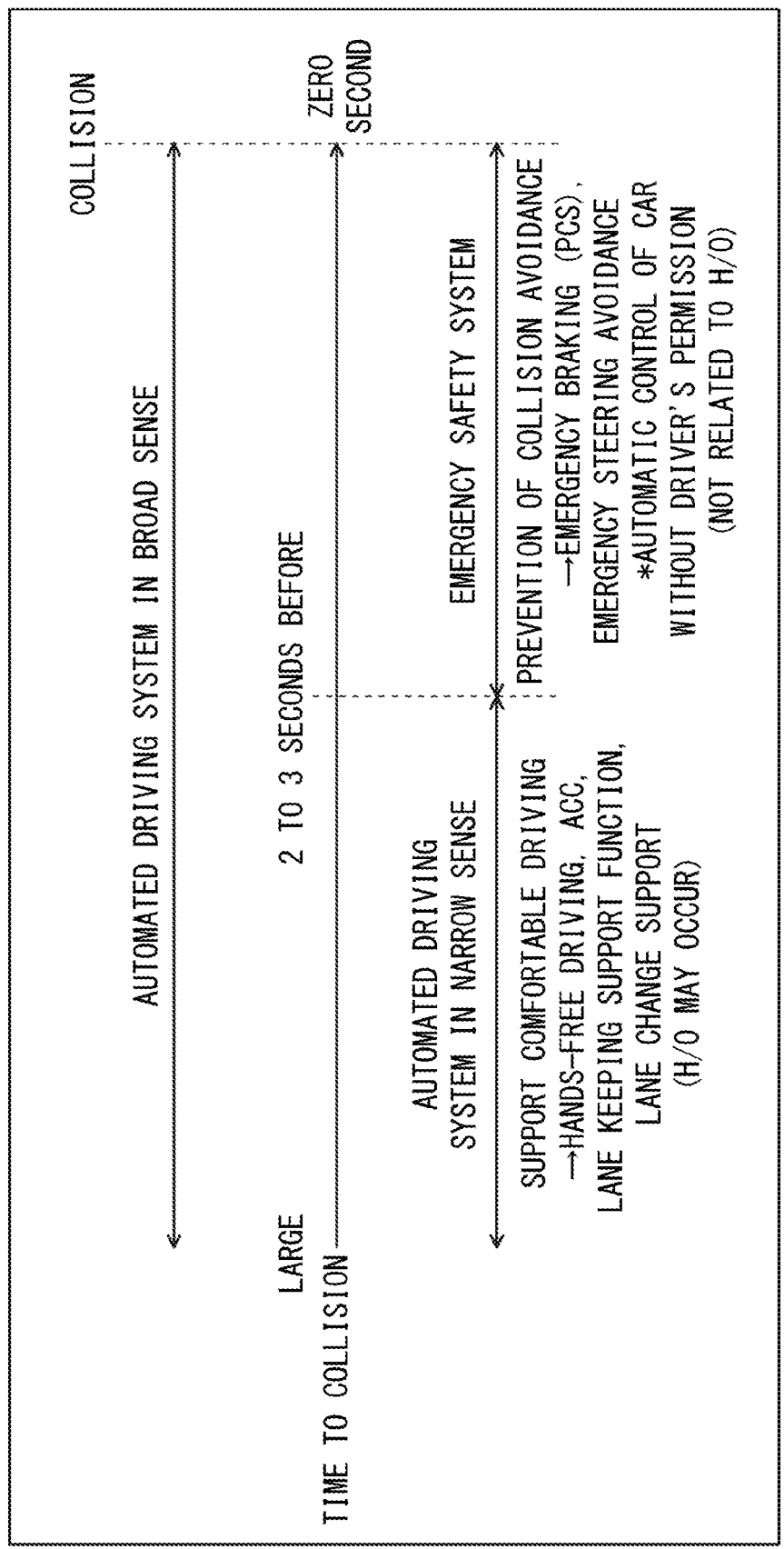
FIG. 8 is a schematic diagram illustrating a relationship between various functions related to automated driving and the time to collision.

The relationship between various functions related to the automated driving of the vehicle and the time to collision is illustrated in FIG. 8.

The various automated driving functions include both the "automated driving system in a narrow sense" and the "emergency safety system" illustrated in FIG. 8.

The "automated driving system in a narrow sense" is a function to support the comfortable driving of the own vehicle driver and there are various types of the "automated driving system in a narrow sense" such as a hands-free driving support function, an adaptive cruise control (ACC) function, a lane keeping support function, and a lane change support function. Also, in the case of the "automated driving system in a narrow sense", the handover may occur.

On the other hand, the "emergency safety system" is a function for preventing a collision between the host vehicle and another vehicle and the like. In the "emergency safety system", even without driver's permission, for example, the operation is automatically started from two to three seconds before the expected collision time. As the "emergency safety system", an emergency steering avoidance system and the like are also assumed besides the pre-crash safety system described above. In a case of the "emergency safety system", the handover does not occur.

Advantages of In-Vehicle System

In the in-vehicle system 100 described above, by using the hands-free calling function, it is possible to use the mobile phone terminal 30 without impairing safety even while the vehicle is driven except at the time when a special situation occurs, and thus user's convenience can be ensured.

Further, when the host vehicle is travelling using the automated driving function, if a situation requiring the handover to a manual driving mode or the like occurs or the emergency brake is activated, the telephone call or the like of the mobile phone terminal 30 is automatically restricted. Therefore, it is possible to prevent transmission of an important message related to driving to a driver from being inhibited by calls, incoming calls, or the likes, thereby ensuring safety of driving.

Further, when occurrence of the handover is expected, the in-vehicle system 100 executes the handover pre-notification at a time having a sufficient margin with respect to the time at which the handover request occurs. Therefore, the driver can respond to the handover request with a time margin, and thus the smooth handover is realized.

In addition, when the handover pre-notification is executed, the in-vehicle system 100 performs restrictions such as automatic suppression of the call volume, and thus a driver does not need to interrupt the call immediately. Therefore, a driver can also prepare for the handover while continuing the call.

When restriction of calls or the likes of the mobile phone terminal 30 is performed, disconnection of the line or transition to a holding state is performed after the in-vehicle system 100 transmits the guidance message to the terminal of the speech partner, and thus not only the driver of the host vehicle but also the speech partner can grasp the situation when the call is interrupted. Therefore, when the call is interrupted, the speech partner will not call back unnecessarily, and thus convenience is improved.

In the embodiment described above, only a case where a hands-free call is performed using the mobile phone terminal 30 is assumed. However, even when messages such as e-mails are sent, received, displayed or the like, it is assumed that in the similar way, communication is restricted or the output of the display or sound is suppressed when an important notification related to driving occurs.

Here, the features of the in-vehicle system according to the embodiment of the invention described above are briefly summarized below in the following <1> to <5>.

<1> An in-vehicle system mountable on a vehicle having an automated driving function for automatically controlling at least one of steering and a vehicle speed of the vehicle, the in-vehicle system including:

an information presentation unit configured to present information related to automated driving to a driver of the vehicle; and a call management unit (information input/output control unit 20, call management unit 28) connectable to a mobile terminal (mobile phone terminal 30) capable of wireless communication, wherein when a situation in which the information presentation unit presents information related to automated driving is detected, the call management unit automatically restricts an operation of the mobile terminal (S14, S16, S19).

<2> The in-vehicle system according to <1> described above, wherein when it is expected that a first state where the operation of the mobile terminal should be restricted occurs, the call management unit presents advance notice information (handover announcement display 41, 51) related to operation restriction of the mobile terminal at a time of a second state at least a certain time or a predetermined distance before the vehicle reaches the first state.

<3> The in-vehicle system according to <1> or <2> described above, wherein when it is expected that the first state where the operation of the mobile terminal should be restricted occurs, the call management unit automatically switches an extent of the operation restriction of the mobile terminal according to an amount of a remaining time or distance until the vehicle reaches the first state (S14, S16).

<4> The in-vehicle system according to any one of <1> to <3> described above, wherein when the operation of the mobile terminal is restricted or a restriction of the operation of the mobile terminal is expected, the call management unit automatically transmits information related to the restriction to a second terminal communicating with the mobile terminal (S17, S20).

<5> The in-vehicle system according to <4> described above, wherein the call management unit executes communication restriction between the mobile terminal and the second terminal after a process for transmitting the information related to the restriction is finished (S21).

The invention claimed is:

1. An in-vehicle system mountable on a vehicle having an automated driving function for automatically controlling at least one of steering and a vehicle speed of the vehicle, the in-vehicle system including:
- an information presentation device that includes a display area that is configured to present information related to automated driving to a driver of the vehicle; and
- a call management unit connectable to a mobile terminal capable of wireless communication,
- wherein when a situation in which the information presentation device presents information related to automated driving is detected, the call management unit automatically restricts an operation of the mobile terminal and
- wherein when the operation of the mobile terminal is restricted or a restriction of the operation of the mobile terminal is expected, the call management unit automatically transmits information related to the restriction to a second terminal communicating with the mobile terminal.

2. The in-vehicle system according to claim 1, wherein when it is expected that a first state where the operation of the mobile terminal should be restricted occurs, the call management unit presents advance notice information related to operation restriction of the mobile terminal at a time of a second state at least a certain time or a predetermined distance before the vehicle reaches the first state.

3. The in-vehicle system according to claim 1, wherein when it is expected that a first state where the operation of the mobile terminal should be restricted occurs, the call management unit automatically switches an extent of the operation restriction of the mobile terminal according to an amount of a remaining time or distance until the vehicle reaches the first state.

4. The in-vehicle system according to claim 1, wherein the call management unit executes communication restriction between the mobile terminal and the second terminal after a process for transmitting the information related to the restriction is finished.

5. The in-vehicle system according to claim 1, wherein the information related to automated driving is information demanding the driver to take over driving from the vehicle performing automated driving.

* * * * *